April 26, 1960   C. E. ROBINSON   2,934,662
ALTERNATING ELECTRIC CURRENT GENERATORS
Filed Oct. 1, 1958
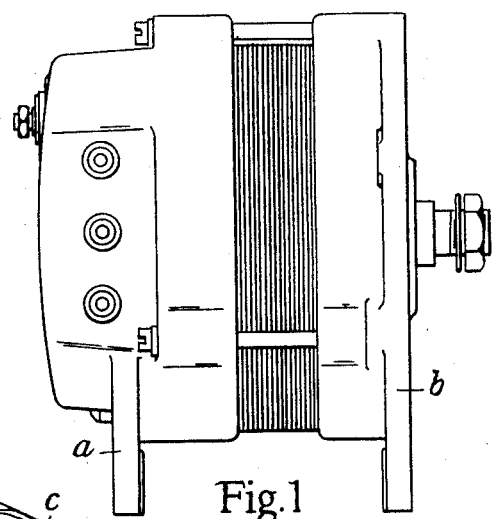
Fig.1
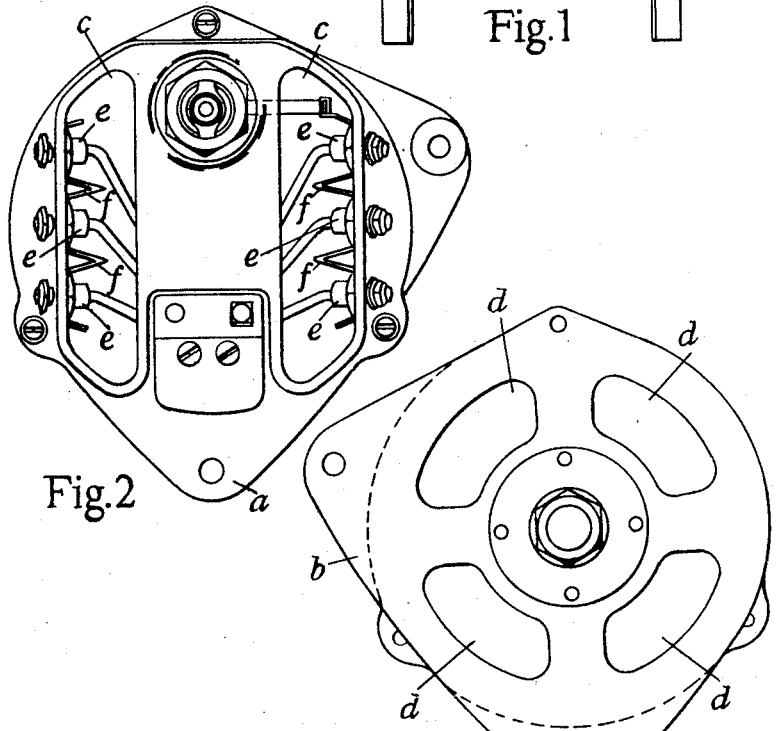
Fig.2
Fig.3
Inventor
C. E. Robinson
By Glascock Downing Seebold
Attys.

United States Patent Office 2,934,662
Patented Apr. 26, 1960

2,934,662

ALTERNATING ELECTRIC CURRENT GENERATORS

Charles Edwin Robinson, Solihull, England, assignor to Joseph Lucas (Industries) Limited, Birmingham, England Application October 1, 1958, Serial No. 764,660

Claims priority, application Great Britain October 7, 1957

1 Claim. (Cl. 310—68)

This invention relates to alternating electric current generators having combined therewith diode rectifiers of the semi-conductive crystal type for converting the alternating current to a direct current.

The object of the invention is to enable overheating of the rectifiers to be prevented in a simple and reliable manner.

In a generator in accordance with the invention the rectifiers of one polarity are interconnected by a thin heat-dissipating metal strip, and those of the other polarity are interconnected by another like strip, the two strips being so shaped and located that they can be cooled by the action of an air stream flowing through the generator.

In the accompanying drawings:

Figure 1 is a side elevation, and Figures 2 and 3 are opposite end elevations of a 3-phase alternating current generator, provided with the invention.

Referring to the drawings, the end cover $a$ of the generator casing has formed in it apertures $c$ and the end cover $b$ has formed in it apertures $d$ through which an air stream can flow into and out of the dynamo under the action of a fan contained in the generator and driven by the rotor. The rectifiers are mounted on the interior of the cover $a$ at which the air stream enters, and are divided into two groups. Each group contains three rectifiers $e$, and the two groups are mounted at opposite sides of the rotor axis. The three rectifiers in each set are interconnected by a thin metal strip $f$. At positions between the rectifiers, each strip is bent to a V or other form and arranged to extend into the air stream, so that the air can flow over both sides of the strip.

By the use of metal strips in the above manner, effective cooling of the rectifiers is ensured in a very simple manner.

Having thus described my invention what I claim as new and desire to secure by Letters Patent is:

An alternating electric current generator having in combination a casing provided at opposite ends respectively with a pair of apertured end covers through which a cooling air stream can flow into one end and out of the other end of the casing, diode rectifiers of the semi-conductive crystal type mounted in two groups of opposite polarity within the end cover through which the cooling air stream enters the casing, and a pair of thin heat-dissipating metal strips forming electrical connections between the rectifiers in each of the two groups respectively, and having at positions between the rectifiers electrically connected thereby bent portions which extend into the path of the cooling air stream entering the casing.

References Cited in the file of this patent

UNITED STATES PATENTS 2,550,013   Kureth _____ Apr. 24, 1951

FOREIGN PATENTS 627,006   Great Britain _____ July 26, 1949
911,198   France _____ July 1, 1946